United States Patent
Li et al.

[15] 3,637,488
[45] Jan. 25, 1972

[54] REMOVAL OF INORGANIC SPECIES BY LIQUID MEMBRANE

[72] Inventors: Norman N. Li, Edison; Robert P. Cahn, Millburn; Adam L. Shrier, Upper Montclair, all of N.J.

[73] Assignee: Esso Research and Engineering Company

[22] Filed: May 12, 1970

[21] Appl. No.: 36,686

Related U.S. Application Data

[63] Continuation-in-part of Ser. No. 28,094, Apr. 13, 1970.

[52] U.S. Cl. .................................. 210/22, 210/23, 210/28, 210/42
[51] Int. Cl. .................................................. B01d 13/00
[58] Field of Search ......................... 210/21–23, 28, 210/42, 59

[56] References Cited

UNITED STATES PATENTS

| | | |
|---|---|---|
| 2,761,563 | 9/1956 | Waterman et al. .......................210/21 |
| 2,773,027 | 12/1956 | Powers..................................210/21 X |
| 3,389,078 | 6/1968 | Elzinga et al...........................210/21 X |
| 3,398,088 | 8/1968 | Okey.....................................210/23 X |
| 3,410,794 | 11/1968 | Li..........................................210/21 X |
| 3,446,732 | 5/1969 | Gasser et al. .............................210/44 |
| 3,454,489 | 7/1969 | Li ..............................................210/22 |
| 3,522,346 | 7/1970 | Chang..................................210/22 X |

Primary Examiner—Reuben Friedman
Assistant Examiner—Thomas G. Wyse
Attorney—Chasan and Sinnock and Michael Conner

[57] ABSTRACT

Inorganic species are removed from liquid streams such as waste water streams by treatment with an emulsion of reagent-containing aqueous droplets suspended in an organic liquid containing surfactant which forms a membrane around said aqueous droplets. The inorganic species, such as phosphates in waste water will permeate the membrane; the reagent within the droplet is such that it will react with the permeating inorganic species to form a new compound which will precipitate and remain within the droplets. The emulsion is then removed from the system.

13 Claims, No Drawings

REMOVAL OF INORGANIC SPECIES BY LIQUID MEMBRANE

RELATED APPLICATIONS

This application is a continuation-in-part of application No. 28,094, filed Apr. 13, 1970, entitled "Removal of Organic Compounds by Liquid Membrane." Inventors: Norman N. Li, Robert P. Cahn and Adam L. Shrier.

BACKGROUND OF THE INVENTION

This invention pertains to a process for separating inorganic species from aqueous and nonaqeous streams. More particularly, this invention pertains to a process for separating inorganic species, especially anionic contaminants, from waste water streams. The separation of such inorganic species is effected by treating the waste water with an emulsion of droplets of an aqueous solution containing a compound or reagent, said droplets being suspended in a nonaqueous surfactant solution, said surfactant solution forming a liquid membrane through which the inorganic species, e.g., phosphate, will permeate. Within the droplet is a reagent which will react chemically with the inorganic species, e.g., phosphate, and cause a precipitate of the inorganic to form. In a preferred embodiment the inorganic reagent is calcium ion. Subsequently the droplets containing the precipitate are removed from the system by separating the emulsion with its contained droplets from the treated aqueous or nonaqueous stream.

A major pollution problem associated with aqueous streams is the presence of inorganic compounds such as sodium phosphate, sulfides, sulfites or nitrates, arsenic, cyanides, etc. In particular, the phosphates have been extremely troublesome since they lead to excessive algae growth in lakes and rivers, with resultant upset to the normal ecological balance. Often this leads to eutrophication of natural lakes resulting in destruction of fish-life, inability of rivers to handle normal waste products, and eventual conversion of lakes into marshland. Excessive phosphates are a recent problem brought about by the use of such materials as fertilizers and detergent builders. The municipal and industrial effluents containing these detergent phosphates add to the normal phosphate content present in all metabolic waste products, leading to excessive nutrient supply for algae as discussed above.

Other inorganic compounds such as arsenic and cyanide, found in industrial effluents, have obvious toxic properties and their concentration is strictly limited. Nitrates or ammonium salts are present in industrial effluents, such as from steel mills, fertilizer plants, etc., or as a result of fertilizing with nitrogen-containing materials. They will also act as nutrients in lakes and rivers for algae and other undesirable growths. Sulfides, and sulfites are present in many industrial waste streams, and are objectionable not only from an odor point of view, but also in that they impose a high biological oxygen demand.

In the past the phosphate impurities were removed by adding precipitating agents directly to the waste water stream. This technique presents several disadvantages: initially, a large scale problem with settling and/or filtration was encountered because of the large amount of waste water effluent. Secondly, there was contamination of the effluent with the excess precipitating agent which often has to be added to achieve quantitative phosphate removal. Also, pH of the entire effluent has to be adjusted to the right level to optimize precipitation.

Removal of cyanide was effected in the past by chemical methods, adsorption or by bio-degradation in secondary treatment.

These procedures, although somewhat effective, still presented difficulty because they are either very specific for each ion to be removed i.e., a proper chemical precipitation agent has to be selected at the proper conditions or if a general method such as bio-degradation or adsorption on charcoal is used, removal may be either incomplete or uneconomical.

SUMMARY OF THE INVENTION

According to this invention, it has unexpectedly been discovered that a liquid membrane, such as that disclosed in U.S. Pat. 3,454,489, may be utilized to separate inorganic compounds, such as phosphate, from waste waters. The liquid membrane coats emulsion-size aqueous phase droplets which contain an ion capable of reacting with the inorganic contaminates such as phosphate to form a precipitate which remains within the droplet. In the event that the compound to be separated is sodium phosphate the material within the droplets may be any of the following: water soluble, calcium or magnesium salt, such as calcium chloride, magnesium chloride, a hydroxide such as calcium hydroxide or magnesium hydroxide, or a combination of the above in the absence or presence of additional materials such as ammonium hydroxide. Also, iron salts which are known to form insoluble precipitates with phosphate ion.

The contaminating inorganic compound, such as sodium phosphate, will permeate through the particular surfactant membranes. The membranes are formed from a solution of oil-soluble surfactants in an organic compound which is immiscible with the aqueous stream being treated and also immiscible with the aqueous solution in the contained droplets. Preferably, the solubility of the membrane materials in the aqueous phase should be very low to prevent losses and contamination.

As mentioned previously the membranes are composed of surfactants and a solvent for the surfactants; surfactants are surface active agents having hydrophobic and hydrophilic ends. In the previously mentioned patent in which liquid membranes were disclosed, the individual droplets did not contain chemicals which would react with the permeating compound to form a precipitate, said precipitate being retained within the droplets.

In the instant invention, inorganic species which pollute aqueous or nonaqueous solutions, such as phosphates may be removed rapidly and efficiently by forming a precipitate which results from the reaction of the contaminant and a chemical contained within the liquid membrane-enclosed droplets, said precipitate by its nature being incapable of permeating back through the membrane. Also, by selecting proper conditions within the droplet, essentially quantitative precipitation of the contaminating species within the droplet is possible. Thus, the effective concentration of free contaminant within the droplet is close to zero, allowing nearly complete removal of contaminant from the waste water stream outside, since a good concentration difference, which is the driving force for permeation through the membrane, is always maintained between the inside and outside of the liquid membrane.

It should be noted that this explains one of the major advantages of liquid membrane cleanup of waste water streams. Thus, to achieve good phosphate removal by calcium phosphate precipitation, a high calcium ion concentration and high pH are necessary. It is possible to achieve such conditions within the droplets of a liquid membrane emulsion, but it is entirely unrealistic to maintain such conditions in a large waste water effluent stream.

In more detail, the instant invention pertains to the separation of inorganic compounds which are dissolved in solutions such as waste water streams. The inorganic compounds which are not dissolved in water but instead form colloidal suspensions or emulsions with water can be removed from waste water streams by absorption on and absorption into the liquid membranes.

In particular phosphate, which is usually in the form of sodium phosphate, or monohydrogen phosphate or dihydrogen phosphate as well as other inorganic impurities such as sulfides, cyanides and nitrates may be removed from aqueous streams. Such contaminates tend to be present in aqueous streams in the amount of about 0.1 to 1,000 parts per million or more typically about 1 to 200 p.p.m. Streams containing these inorganic impurities are found in chemical plant water, in municipal effluents and in waste streams even from secondary municipal sewage treatment plants.

The process of the instant invention facilitates the removal of inorganic species such as phosphates from waste water streams. To accomplish this result, the streams must be contacted with an emulsion of droplets coated by a liquid surfactant membrane. The droplets encompass a particular reagent which will react with the permeating species and cause it to precipitate. The precipitated compound which results remains within the liquid membrane.

As discussed above, permeation of a membrane soluble species through the membrane will occur if there is a concentration difference between the solutions on the outside and the inside of the membrane, i.e., in the waste water stream to be treated, and in the emulsion droplet.

If there is no reagent in the droplet, diffusion through the membrane will slow down and stop as soon as the concentrations of permeating species on both sides of the membrane approach each other as a result of permeation. If, however, there is a reagent within the droplet which reacts with the permeating contaminant species to form a precipitate which is insoluble in both the droplet liquid and the liquid membrane, then two things happen. First of all, the concentration of permeating contaminant on the inside of the membrane is maintained at a low level assuring continued removal of contaminant from the outside waste water stream down to a very low level; secondly, the formation of the insoluble precipitate prevents back-permeation of the contaminant species from the droplet into the waste water stream. Since the concentration of precipitate inside the droplet can be allowed to increase to a high level, perhaps one weight of precipitate per one weight of residual aqueous solution in the droplet, very high treat ratios of waste water to treating emulsion can be achieved.

The precipitating agent preferably should be a low-cost material, or mixture of materials, and should contain at least one ion which forms an insoluble precipitate with the contaminant, i.e., calcium salt with phosphate. The precipitate formed within the droplet should have a very low solubility in water for complete removal as previously discussed.

Thus, the typical inorganic contaminant such as phosphate will pass through the liquid membrane and react with the precipitating agent to form calcium phosphate which will stay entrained within the membrane because it cannot escape from the slurry within the droplets of the emulsion.

The droplets which are coated with liquid oil surfactant membrane and contain a base in their interior are formed by slowly pouring the reagent containing aqueous solution into a surfactant solution while intensive mixing is applied. Stirring rates of about 300–1,200 r.p.m. are typical. Times of 10–500 minutes are acceptable. An emulsion containing droplets of the aqueous solution coated with the liquid membrane is made after mixing the entire aqueous solution of caustic in the surfactant solution. Besides stirring, other means of dispersion, such as shearing, electrical dispersion, and ultrasonic vibration, may be used to form small emulsion-size droplets.

In a typical laboratory run, an aqueous solution of precipitating agent may be poured at a rate of about 10 cc./min. into 200 cc. of a surfactant solution at a mixing rate of about 500 r.p.m. The total mixing time for mixing the entire aqueous solution of agent and the surfactant solution is about 10 minutes. The resulting droplets usually have a diameter of $10^{-1}$ to $10^{-5}$ cm., preferably $10^{-3}$ to $10^{-5}$ and most preferably, about $10^{-5}$ cm. A wide variety of different surfactants may be utilized; any of the various oil-soluble surfactants would be satisfactory. Although it is preferred to use surfactants which are very oil soluble and have structure compatibility with the contaminants in waste water for high permeation rate of the contaminants, such as carbon ring structure in the surfactant for benzene removal.

Specifically, the various surfactant groups including the long-chain polar surfactants, fluoro hydro carbon surfactants, silicones and miscellaneous surfactants such as polymeric surfactants may be utilized effectively in the instant invention. Naturally, particular groups will be preferred for a given separation. For instance, when removing phenol from a waste water stream the preferred surfactants are long-chain fatty ester carbohydrates.

In general, the preferred surfactants which are to be utilized in the instant invention are the surfactants which aid in attracting permeates and therefore increase transfer rate. Typical polar groups are $COOH$, $OH$, $NH_2$, $CONH_2$, $SH$, $SO_3H$, and salts of long-chain carboxylic acids and sulfonates. The long-chain polar surfactants include a wide range of compounds such as ethylene glycol polyethers, polyethyleneoxy ethanol, phosphate radical on polyethyleneoxy molecule. The latter is a weakly anionic surfactant.

Short-chain fluorocarbons with polar groups are frequently sufficiently soluble in hydrocarbon oils to function as surfactants. Long-chain fluorocarbons attached to a hydrocarbon chain of sufficient length are soluble in hydrocarbon oils.

Silicone oils differ broadly in their chemical structure and surface-active properties. Those of sufficiently small molecular weight to be soluble in the hydrocarbon solvent and containing $CH_3$ or another group attached to silicon in the $(Si-O)_n$ skeleton can be expected to be surface active.

The final overall grouping can best be called miscellaneous and includes a broad category of macromolecules and polymers such as fatty alcohols.

Since the number of surfactants is extremely large, it is not intended to burden this application with numerous examples. The following publications are herein incorporated by reference. Surface Chemistry by Lloyd I. Osipow, Reinhold Publishing Company, New York (1962) chapter 8 and Surface Activity, Moillet et al., Van Nostrand Company, Inc. (1961) Part III.

Typical surfactants that may be utilized with this invention include Igepal. This is a nonionic surfactant, nonylphenoxypolyethyleneoxy ethanol. It is a trademark of the General Aniline and Film Corporation and has the configuration $RC_6H_4O(CH_2CH_2O)_nCH_2CH_2OH$ where R may be $C_8H_{17}$, $C_9H_{19}$ or $C_{10}H_{21}$ and $n$ varies from 1.5 to 100. Igepals with $n$ values smaller than 8 are oil-soluble surfactants.

Span, a trademark of the Atlas Chemical Industries, is a series of surface active agents in the group of long-chain polar surfactants. Spans are also known as sorbitan fatty acid esters because they are fatty acid esters of anhydro sorbitols condensed with ethylene oxide.

Cellulose acetate, a member of the group of macromolecules and polymers if one of the cellulose esters of the organic acids. By the action of acetic anhydride on cotton in the presence of a little acid, cellulose acetate can be prepared. It has the formula

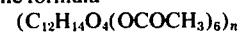
$(C_{12}H_{14}O_4(OCOCH_3)_6)_n$ and $n$ will vary depending on the conditions utilized. It should be emphasized that the reagent within the droplet is in solution, preferably in aqueous solution, or readily available to go into solution, such as suspended $Ca(OH)_2$ which is slightly soluble in the aqueous phase. This is, of course, applicable to any other organic compound which is to be separated from an aqueous solution by the instant invention.

In addition, the most preferred surfactants for the instant invention are combinations of Span 80 and one or more high molecular weight amines. The amines will serve the functions of film strengthening agent and ion exchange or carrier compound to induce phosphate compounds to be soluble in the membrane. In general, polar organic compounds with insignificant solubility in water may be used in place of the amines.

The waste water, containing the reagent such as phosphate is contacted with the emulsion of liquid membrane coated droplets within a separation zone. If desired, good dispersion of the emulsion of the water to be treated or vice versa may be maintained by the use of agitation, say at a speed of 100 to 400 r.p.m. or higher for a period of about 5 to 20 minutes, preferably 10 to 15 minutes. Waste water to emulsion weight ratio usually varies from 200 to 1, depending on the reagent concentration used which can be present at any concentration, usually from 0.1 percent to 20 weight percent and the rest of the drop is water and, perhaps, some additives for various different purposes. The separation zone may also be any of the following: mixer, countercurrent or cocurrent spray tower or sieve-plate tower. It can also be a packed column, a mechanical countercurrent contacting device such as a rotating disc contactor, or a centrifugal contactor. Countercurrent liquid-liquid mixer-settler stages with mechanical or orifice mixers can also be employed. If desired, multistage separation zones may be utilized, but it is possible that there will be sufficient separation of phosphate in an initial stage so that further staging is not necessary. Typically, one to two stages will be utilized. Following the separation of the waste water and the passage of the phosphate into the liquid membrane droplet the contaminant must be separated from the droplets. Within the droplets, phosphate and reagent e.g., calcium react and form a precipitate e.g., calcium phosphate.

Since the precipitate will remain with the liquid membrane-coated droplets, a method is needed to remove the product and thereby recover the membrane for further treating. To separate the contaminant, after it has reacted with the base, the following procedure may be utilized: the emulsion is broken by any of the conventional demulsification methods, such as by heating or by adding a demulsifier. The surfactant solution recovered can then be reused. The aqueous solution recovered may be treated to separate the contaminant. In the case of phosphate removal, with calcium chloride the spent calcium chloride solution may be filtered or settled to remove precipitated calcium phosphate. In this case, any unused original reagent, calcium chloride, is recovered. Other calcium compounds can also be used to react with phosphate, such as calcium hydroxide or calcium oxide either alone or in addition to the calcium chloride. The liquid membrane, the unused reagents and makeup reagents are recycled back into the separation zones for further use. Alternatively, if desired, the entire emulsion or just the aqueous portion thereof may be discarded.

Another method of partial recovery of the spent emulsion is to vaporize the hydrocarbon portion of the emulsion for recycle, leaving the spent aqueous phase and oil-soluble emulsifier behind for discard.

A wide range of temperatures may be utilized in the process of the instant invention since temperature is not critical. There would, however, be a lower and an upper limit which would be satisfactory for separation with a liquid phase surfactant membrane. The lowest temperature should be higher than the freezing temperature of any of the liquids contacted, such as the waste water. It will also have to be higher than the freezing temperature of the emulsified aqueous mixture so that mass transfer will be facilitated. Since liquid membrane permeation rates increase with increasing temperature, as high a temperature as possible and economic should be employed. Typical temperatures would vary from 0° to 60° C., preferably 25° to 40° C. and would most preferably be ambient.

In the event that nonionic surfactants are utilized, the highest temperature should be lower than the precipitation temperature of the surfactant. If an ionic surfactant is to be used, the highest temperature is restricted by the boiling point of the surfactant solution. Of course, the temperature will have to be lower than the boiling point of the aqueous feed or the solvent. Thus, the temperature is to be regulated by the lowest boiling point of the elements in the separation at the pressure of the operation. It would be preferred to use ambient temperature since there is no additional expense in obtaining this level. Pressure is not critical and the most desirable pressure would be ambient, i.e., 1 atmosphere. Sufficient pressure will be needed to maintain all the elements of the separation, i.e., surfactant, solvent and aqueous mixture in the liquid phase, unless, as in the case of carbonate reagent, there is an evolution of $CO_2$ as the permeation progresses. The amount of surfactant to be added to the mixture which is to be separated may also vary within wide ranges. Typically, 0.05 to 2 weight percent of surfactant may be used, preferably 0.1 to 1.0 weight percent.

The permissible surfactant concentration will depend not only on the requirement that the membrane in the emulsion be stable, but on the solubility, i.e., potential loss of surfactant in the aqueous phase being treated. It should also be noted that if spent emulsion is discarded, as low a surfactant concentration as possible (0.1–0.2 percent) should be used, since the surfactant is usually the most expensive constituent of the emulsion. It should be emphasized that the agent within the liquid membrane coated droplet is in solution which is preferably aqueous. Other solutions would be as follows: aqueous solutions of $MgCl$, $FeCl_3$ as well as suspensions of $Ca(OH)_2$ $Mg(OH)_2$, solutions of $Na_2CO_3$, $Na_3BO_4$, etc.

In a preferred embodiment of the instant invention a sodium phosphate containing waste water stream which contains about 0.27 to 0.57 weight percent of phosphate was treated. The stream was directed into a separation zone which was equipped with a mixer. Within the zone was an emulsion made by emulsifying an aqueous solution of calcium compounds i.e., calcium chloride and hydroxide into a surfactant solution containing high molecular weight amines.

The emulsion was composed of approximately one-third aqueous reagent solution and two-thirds organic surfactant solution. The phosphate containing waste water stream was introduced into the zone. The zone was provided with a stirrer and was stirred at a rate of 100 to 200 r.p.m. Waste water was removed from the separation zone and contained about 0.004 to 0.050 weight percent of phosphate which represents a substantial reduction in phosphate concentration. An emulsion of liquid-membrane coated droplets containing precipitate which was calcium phosphate was removed from the treating zone. This emulsion was then treated by the conventional demulsification methods, such as, heating.

SPECIFIC EMBODIMENTS

Example

In the following example, phosphoric acid and monosodium phosphate were removed from aqueous streams. The aqueous solution of phosphate was introduced into a separation zone which was provided with a mixer. The zone was maintained at ambient temperature and pressure. The experiment was conducted with a surfactant which was Span 80, a commercial name for sorbitan monooleate with a viscosity of 1,000 cs. at 25° C. The surfactant was present in an amount of 2 percent by weight. The mixture of emulsion containing surfactant, calcium compounds, surfactant solvents which were S100N, a high molecular weight isoparaffin, high molecular weight amines, with weight below 1,000, and the phosphate contain-

TABLE I.—EXPERIMENTAL PHOSPHATE REMOVAL FROM WASTE WATER

| Run No | 1 | 2 | 3 | 4 | 5 |
|---|---|---|---|---|---|
| 1 Aqueous feed (gm.) | 107 | 1 to 7 | 500 | 1 to 8 | 1 to 7. |
| 2 Phosphic comp | $NaH_2PO_4.H_2O$ | Same as run 1. | $NaH_2PO_4.H_2O$ plus $H_3PO_4$ (1:1 by wt.). | Same as run 3. | Same as run 3. |
| 3 Emulsion used (gm.) | 97 | | 281 | | |
| 4 Surfactant solvent | 49% JMT Primene plus 49% ENJ 3029 | | 95% S100N plus 2% Amberlite plus 2% ENJ 3029 | | |
| 5 Wt. percent organic surfactant solution in emulsion | 66.9 | | 67 | | |
| 6 Surfactant | 2% Span 80 | | 1% Span 80 | | |
| 7 Wt. percent aqueous phase in emulsion | 33.1 | | 33 | | |
| 8 Reagents (wt. percent in aqueous phase) | 6% $CaCl_2$ plus 6% $NH_4OH$ (0.1 N). | None | 15% $CaCl_2$ plus 5% $Ca(OH)_2$. | | None. |

| | $t$[a] | $PO_4^{-3}$ | $Cl^-$ | $PO_4^{-3}$ | $PO_4^{-3}$ | $Cl^{-1}$ | $PO_4^{-3}$ | $PO_4^{-3}$ |
|---|---|---|---|---|---|---|---|---|
| 9 Run data: Feed, weight percent | 0 | 0.565 | 0 | 0.565 | 0.273 | 0 | 0.273 | |
| | 2 | 0.265 | 0.084 | 0.338 | 0.123 | 0.036 | 0.133 | 0.204 |
| | 5 | 0.200 | 0.0168 | 0.314 | 0.073 | 0.065 | 0.120 | 0.205 |
| | 18 | 0.050 | 0.0110 | 0.316 | 0.016 | | 0.075 | 0.206 |
| | 44 | | | 0.294 | 0.004 | 0.103 | 0.018 | 0.204 |

[a] Minutes.

ing aqueous feed was stirred at a rate of 100 r.p.m. for about 50 minutes. The results of the experiment are included below in table I. The feed recovered was analyzed by colorimetric method for phosphate concentration and by titration method for chloride concentration when calcium chloride was used.

The table indicates that in Runs 2 and 5 where there were no calcium compounds inside the droplets, a high phosphate concentration remained after 44 minutes of agitation. Although the membranes themselves did remove some phosphate, such process is highly inefficient and therefore not economical. Whereas in Run 1 where 6.0 weight percent of calcium chloride was used, at the end of 18 minutes only 0.05 percent of phosphate remained. In the other experiments where 15 percent $CaCl_2$ and 5 percent $Ca(OH)_2$ were used, phosphate was reduced from 0.273 to 0.004 percent in 44 minutes in Run 3 and from 0.273 to 0.018 percent in 44 minutes in Run 4.

It should be noted that the Cl content of the waste water rose very slowly, indicating slow permeation of Cl-ion from the "inside" of the emulsion of the outside waste water stream.

What is claimed is:

1. A process for separating inorganic reagents from a solution which comprises passing said solution into a contacting zone wherein it is contacted with an emulsion comprising droplets of a mixture, said droplets containing at least one ion capable of reacting with said reagent and forming a precipitate, said droplets being coated in the emulsion with a liquid surfactant containing membrane, said liquid surfactant being immiscible with said solutions containing said reagent, said membrane being permeable to said reagent, passing at least a portion of said reagent through said liquid membrane whereby it reacts with said ion and is precipitated within the droplet and recovering a solution depleted in said reagent.

2. The process of claim 1 wherein said solution is an aqueous solution.

3. The process of claim 1 wherein said ion is calcium ion.

4. The process of claim 1 wherein said reagent is inorganic phosphate.

5. The process of claim 1 wherein said reagent is cyanide.

6. The process of claim 1 wherein the ion capable of reacting with said contaminant is in the form of calcium chloride.

7. The process of claim 1 wherein said surface active agent is a surface active sorbitan fatty acid ester.

8. A process for separating inorganic phosphate from an aqueous solution which comprises passing said solution into a contacting zone wherein it is contacted with an emulsion comprising droplets of a mixture, said droplets containing at least one source of calcium ion which is capable of reacting with said phosphate and causing it to precipitate, said droplets being coated in the emulsion with a liquid surfactant containing membrane, said membrane being permeable to said phosphate, passing at least a portion of said phosphate through said liquid membrane, allowing the phosphate ion to react with the calcium ion and forming a precipitate within the droplet and recovering an aqueous phase depleted in said phosphate.

9. The process of claim 8 wherein said calcium ion is in the form of calcium chloride.

10. The process of claim 8 wherein said calcium ion is in the form of calcium hydroxide.

11. The process of claim 8 wherein a magnesium ion is substituted for the calcium ion.

12. The process of claim 8 wherein the droplet diameter is $10^{-1}$ to $10^{-5}$ centimeters.

13. The process of claim 8 wherein said surface active agent is a sorbitan fatty acid ester.

* * * * *